(12) United States Patent
Biedenweg et al.

(10) Patent No.: US 8,925,893 B2
(45) Date of Patent: Jan. 6, 2015

(54) LOCKDOWN DEVICE FOR REFRIGERATED DISPLAY CASES

(71) Applicant: Hill Phoenix, Inc., Conyers, GA (US)

(72) Inventors: Douglas A. Biedenweg, Bracey, VA (US); Lawrence W. Eget, Powhatan, VA (US); Kevin A. Kistner, Chesterfield, VA (US); Nelson Montanez, Petersburg, VA (US); Terrell D. Tucker, Prince George, VA (US); John C. Turner, III, Midlothian, VA (US)

(73) Assignee: Hill Phoenix, Inc., Conyers, GA (US)

( * ) Notice: Subject to any disclaimer, the term of this patent is extended or adjusted under 35 U.S.C. 154(b) by 81 days.

(21) Appl. No.: 13/753,273

(22) Filed: Jan. 29, 2013

(65) Prior Publication Data

US 2014/0212209 A1   Jul. 31, 2014

(51) Int. Cl.
*F16M 1/00* (2006.01)
*B60P 7/08* (2006.01)

(52) U.S. Cl.
CPC .................................. *B60P 7/0807* (2013.01)
USPC ........... 248/680; 248/501; 248/500; 248/505; 52/715; 52/712; 312/351.13

(58) Field of Classification Search
CPC .. A47B 21/04; A47B 97/00; A47B 2097/008; B41J 29/04
USPC ......... 248/680, 500, 501, 502, 154, 510, 506, 248/505, 503, 300, 499, 673; 52/715, 712, 52/698; 312/351.13
See application file for complete search history.

(56) References Cited

U.S. PATENT DOCUMENTS

| | | | | | |
|---|---|---|---|---|---|
| 1,070,813 | A | * | 8/1913 | Kentana | 52/285.3 |
| 1,481,396 | A | * | 1/1924 | Ternes | 248/680 |
| 1,758,646 | A | * | 5/1930 | Brown | 248/681 |
| 1,848,085 | A | | 3/1932 | Eisenschmidt | |
| 1,939,223 | A | * | 12/1933 | Palmer | 403/398 |
| 2,389,964 | A | * | 11/1945 | Eckel | 411/457 |
| D167,722 | S | * | 9/1952 | Rosenthal, Jr. | D6/503 |
| 2,994,395 | A | * | 8/1961 | Hall | 180/68.5 |
| 3,500,604 | A | * | 3/1970 | Vandall | 52/489.1 |
| 3,669,480 | A | * | 6/1972 | Fugate | 403/400 |
| 3,741,428 | A | * | 6/1973 | Evjen et al. | 220/476 |
| 3,742,671 | A | * | 7/1973 | Ellis | 52/507 |
| 3,858,837 | A | | 1/1975 | Merritt | |
| 3,860,206 | A | * | 1/1975 | Wenig | 248/677 |
| 3,942,682 | A | * | 3/1976 | McKay | 221/58 |

(Continued)

*Primary Examiner* — Kimberly Wood
(74) *Attorney, Agent, or Firm* — Foley & Lardner LLP

(57) ABSTRACT

A lockdown device for a display case includes a platform configured to couple the lockdown device to a surface, and a lockdown bracket coupled to the platform and configured to attach to the display case. The lockdown bracket includes a first connecting portion having a substantially horizontal plate coupled to the platform, and a second receiving portion. The second receiving portion includes a substantially vertical plate, a first side plate having a first set of slots, the first side plate coupled to the vertical plate and forming a non-right angle with the vertical plate. The second receiving portion also includes a second side plate having a second set of slots, the second side plate coupled to the vertical plate and forming a non-right angle with the vertical plate. Both sets of slots are configured to attach to the display case, and the side plates are configured to reduce the movement of the lockdown bracket relative to the display case.

17 Claims, 6 Drawing Sheets

(56) References Cited

U.S. PATENT DOCUMENTS

| | | | | |
|---|---|---|---|---|
| 4,031,664 A | * | 6/1977 | Wendt | 49/409 |
| 4,033,531 A | * | 7/1977 | Levine | 248/558 |
| 4,333,575 A | * | 6/1982 | Wong | 211/118 |
| D275,264 S | | 8/1984 | Wegener | |
| 4,669,695 A | * | 6/1987 | Chou | 248/500 |
| 4,723,746 A | * | 2/1988 | Gould et al. | 248/205.1 |
| 4,826,117 A | * | 5/1989 | Bastian et al. | 248/188.2 |
| 4,890,813 A | * | 1/1990 | Johnson et al. | 248/680 |
| 5,042,217 A | * | 8/1991 | Bugbee et al. | 52/643 |
| 5,076,525 A | * | 12/1991 | Whipple | 248/300 |
| 5,174,543 A | * | 12/1992 | Corson et al. | 248/680 |
| 5,274,981 A | * | 1/1994 | Commins | 52/712 |
| 5,603,682 A | * | 2/1997 | Grider | 482/142 |
| 5,653,079 A | * | 8/1997 | Loeffler et al. | 52/712 |
| 5,720,460 A | * | 2/1998 | Watson | 248/297.21 |
| 5,799,921 A | * | 9/1998 | Stattel | 248/501 |
| 6,460,297 B1 | | 10/2002 | Bonds et al. | |
| 6,533,238 B2 | * | 3/2003 | Barnes et al. | 248/680 |
| 6,625,945 B2 | * | 9/2003 | Commins | 52/293.3 |
| 6,739,562 B2 | | 5/2004 | Rice | |
| D492,889 S | | 7/2004 | Craine | |
| 6,792,733 B2 | * | 9/2004 | Wheeler et al. | 52/656.1 |
| 6,931,813 B2 | | 8/2005 | Collie | |
| D511,086 S | | 11/2005 | Craine | |
| 7,007,432 B2 | * | 3/2006 | Commins | 52/293.3 |
| D523,735 S | | 6/2006 | Craine | |
| 7,191,998 B1 | * | 3/2007 | Chalberg et al. | 248/676 |
| 7,216,465 B2 | * | 5/2007 | Saldana | 52/655.1 |
| 7,398,620 B1 | * | 7/2008 | Jones | 52/92.2 |
| 7,585,084 B2 | * | 9/2009 | Kinnune et al. | 362/147 |
| 7,648,379 B2 | | 1/2010 | Johnson et al. | |
| 7,712,283 B2 | | 5/2010 | Gadd et al. | |
| 7,717,376 B2 | | 5/2010 | Sparks | |
| 7,826,202 B2 | | 11/2010 | Johnson et al. | |
| 7,841,878 B2 | | 11/2010 | Johnson et al. | |
| 7,856,763 B2 | | 12/2010 | Keys et al. | |
| 7,913,472 B2 | * | 3/2011 | Troth et al. | 52/696 |
| 8,172,588 B2 | | 5/2012 | Johnson et al. | |
| 8,172,589 B2 | | 5/2012 | Johnson et al. | |
| 8,225,575 B2 | | 7/2012 | Gadd et al. | |
| D665,656 S | | 8/2012 | Anzelmo | |
| 8,281,541 B2 | * | 10/2012 | Lucey et al. | 52/706 |
| 2007/0209311 A1 | | 9/2007 | Keys | |
| 2010/0243831 A1 | | 9/2010 | Gadd et al. | |
| 2011/0099939 A1 | | 5/2011 | Keys et al. | |
| 2012/0193493 A1 | | 8/2012 | Rekasch | |

* cited by examiner

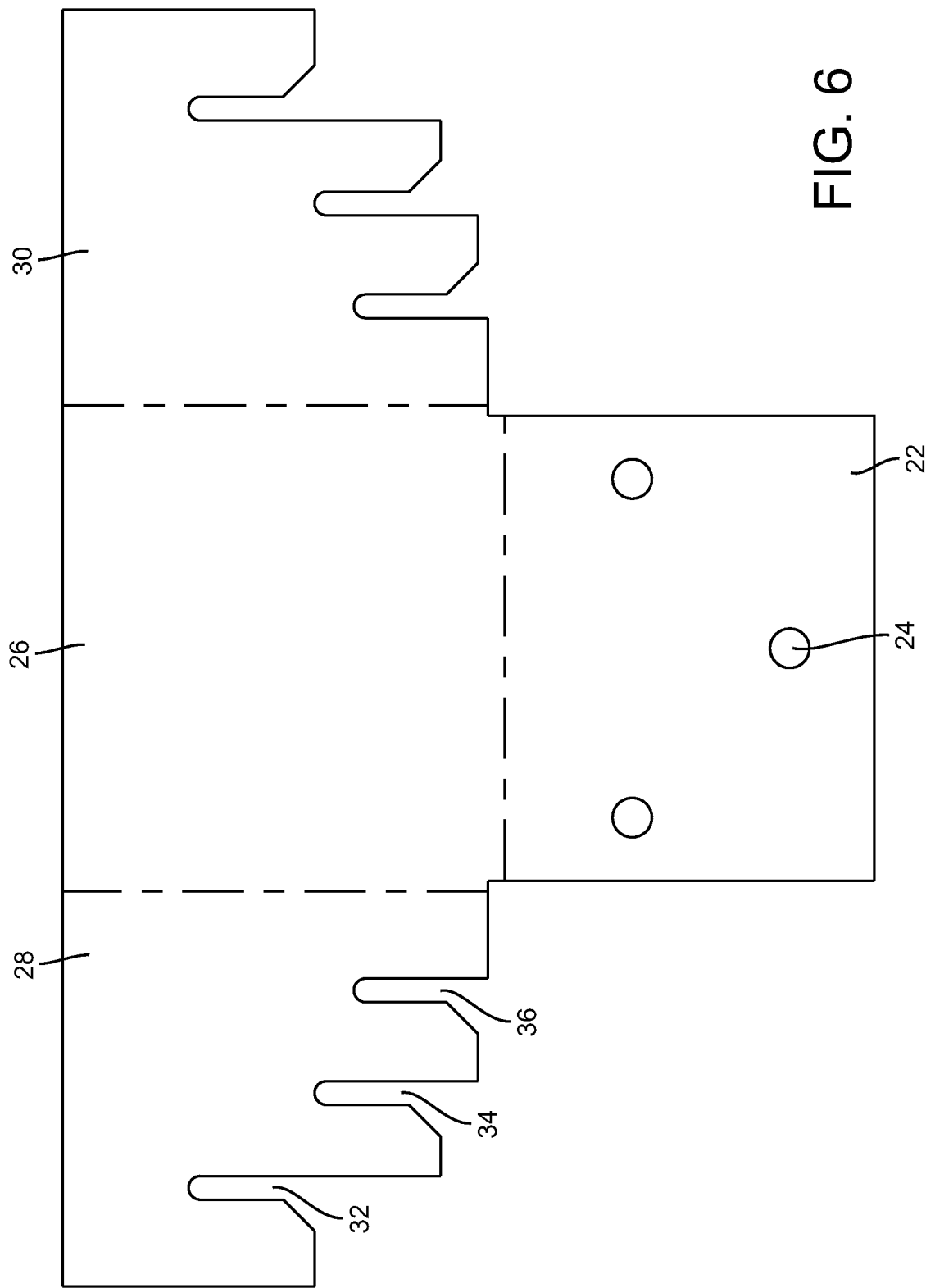

LOCKDOWN DEVICE FOR REFRIGERATED DISPLAY CASES

FIELD

The present disclosure relates generally to lockdown devices for large shippable objects. The present disclosure relates more particularly to lockdown devices for shippable objects having wheels, such as temperature-controlled display cases having casters.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Large shippable objects having casters or other wheels, such as temperature-controlled (e.g. refrigerated, heated, etc.) display cases, are typically transported by loading the objects into a shipping trailer. The casters or wheels on the objects allow the objects to move freely within a factory, store or a warehouse, but may also tend to cause the objects to move within the trailer during shipping. As the objects move within the shipping trailer, the objects can potentially cause damage to each other or to other cargo, or to the trailer itself. Typically, the casters or wheels have included a lock to prevent the wheels from moving, which is intended to prevent the objects from moving within the trailer. However, even with the wheels "locked," there is still the potential for the objects to slide, fall over, or "unlock," damaging the objects or the trailer. Also, the weight of the objects may overcome the wheel lock (e.g. while the shipping trailer is traveling at high speeds or braking, etc.).

An example of a conventional bracket for holding down large moveable objects can be found in U.S. Pat. No. 7,697,268, issued Apr. 13, 2010, for "Modular Electrical Distribution System for a Building." This patent discloses a "hold down bracket" having rearwardly and upwardly projecting hooks which are intended to attach to the moveable object. However, this bracket has a single set of hooks formed for a particular object, and may therefore allow movement if attached to another similar object.

SUMMARY

An embodiment of the present disclosure relates to a lockdown device for a display case. The lockdown device includes a platform configured to couple the lockdown device to a surface, and a lockdown bracket coupled to the platform and configured to attach to the display case. The lockdown bracket includes a first connecting portion having a substantially horizontal plate coupled to the platform, and a second receiving portion.

In this embodiment, the second receiving portion includes a substantially vertical plate with a first side coupled to the horizontal plate and a second side opposite a third side, a first side plate comprising a first set of slots, the first side plate coupled to the second side of the vertical plate and forming a non-right angle with the vertical plate, and a second side plate comprising a second set of slots, the second set of slots corresponding with the first set of slots, the second side plate coupled to the third side of the vertical plate and forming a non-right angle with the vertical plate, the second side plate positioned non-parallel to the first side plate. Both sets of slots are configured to attach to the display case, and the side plates are configured to reduce the movement of the lockdown bracket relative to the display case.

Another embodiment of the present disclosure relates to a lockdown bracket for a display case. The lockdown bracket includes a horizontal plate configured to attach to a surface, a vertical plate having a first side coupled to the horizontal plate and a second side opposite a third side, a first side plate having a first set of staggered slots, the first side plate coupled to the second side of the vertical plate and forming a non-right angle with the vertical plate, and a second side plate having a second set of staggered slots corresponding with the first set of staggered slots, the second side plate coupled to the third side of the vertical plate and forming a non-right angle with the vertical plate, and the second side plate positioned non-parallel to the first side plate. In this embodiment, both sets of slots form a group of staggered pairs of slots, where at least one of the staggered pairs of slots is configured to attach to the display case, and the side plates are configured to resiliently engage edges of one of the staggered pairs of slots against a surface of the display case to restrict movement of the display case.

BRIEF DESCRIPTION OF THE DRAWINGS

The disclosure will become more fully understood from the following detailed description, taken in conjunction with the accompanying figures, wherein like reference numerals refer to like elements, in which:

FIG. 6 is a flat representation of the lockdown bracket of FIG. 2.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting. While the disclosure refers to the objects as "refrigerated display cases" for convenience, the disclosure is applicable to a wide variety of shippable objects having mobility features (e.g. wheels, casters, etc.) and may include freezers, heated display cases, restaurant and/or kitchen equipment, buffet bars, etc., all of which are intended to be included within the scope of this disclosure.

Figure 1:
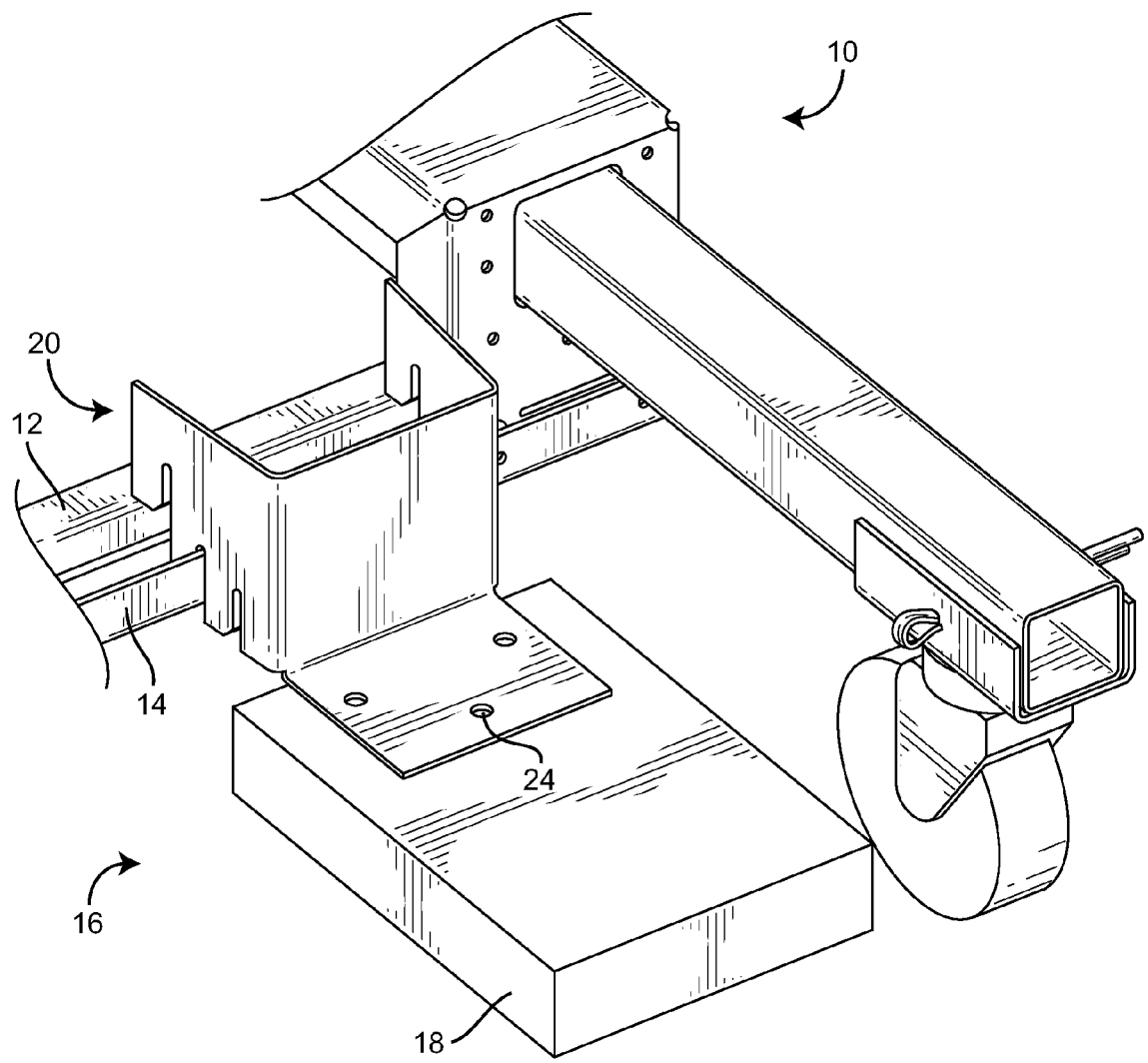
FIG. 1 is a perspective view of a lockdown device attached to a refrigerated display case, according to an exemplary embodiment.

Referring to FIG. 1, a perspective view of a lockdown device 16 attached to a refrigerated display case 10 is shown, according to an exemplary embodiment. The lockdown device 16 includes a base shown as a platform 18 configured to mount and anchor the lockdown device 16 to a surface (e.g. the floor of a shipping trailer, etc.), preventing the lockdown device 16 from moving relative to the surface. The platform 18 may be mounted to the surface by removably engaging a fastener (e.g. screw, bolt, nail, etc.) through the platform 18 and into the surface. The platform 18 may also be mounted to the surface by any other means suitable for the particular application (e.g. clamps, etc.). The platform 18 may be reused by removing the platform 18 from the surface and re-mounting with another object. In exemplary embodiments, the platform 18 is made from wood, such as a 2"×6" lumber segment or block, but may be made from another material in other embodiments. In the illustrated embodiment of FIG. 1, the platform 18 is shown as rectangular, but the platform 18 may have another shape in other embodiments.

The lockdown device 16 is also shown to include a lockdown bracket 20 coupled to the platform 18. The lockdown bracket 20 is coupled to the platform 18 by one or more locking assemblies (not shown). The lockdown bracket 20 includes a first connecting portion (shown as a substantially horizontal area) having one or more connecting holes 24 that are sized to receive the locking assemblies. In exemplary embodiments, the locking assemblies include a fastener driven into the platform 18 through the connecting holes 24. The lockdown bracket 20 also includes a second receiving portion (shown as a substantially vertical region) that is configured to attach to, and secure, the refrigerated display case 10. The refrigerated display case 10 is shown to include a bottom frame 12 having a side wall 14. The second receiving portion of the lockdown bracket 20 includes lateral sides 28 and 30, each having a plurality of paired slots 32, 34, and 36 (shown in FIG. 2), with one of the pairs of slots 32, 34, or 36 configured to fit over the side wall 14, substantially preventing the refrigerated display case 10 from moving horizontally and vertically relative to the floor surface. The lockdown bracket 20 is shown in further detail in FIGS. 2 through 6.

Figure 2:
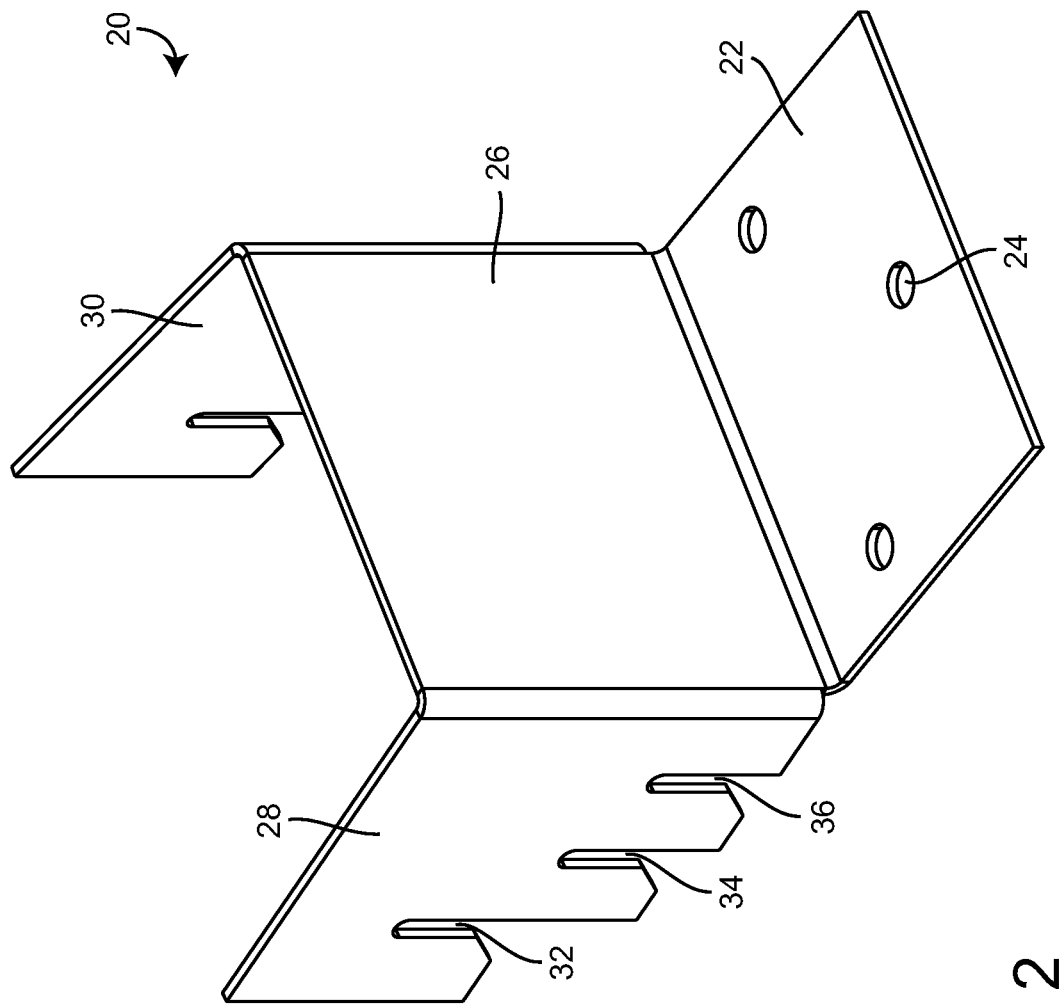
FIG. 2 is an isometric view of a lockdown bracket for a refrigerated display case, according to an exemplary embodiment.

Referring now to FIG. 2, an isometric view of the lockdown bracket 20 is shown, according to an exemplary embodiment. The lockdown bracket 20 is made from galvanized steel in exemplary embodiments, but may be made from another metal or any other suitable material in other embodiments. The second receiving portion of the lockdown bracket 20 includes a front plate 26, two side plates 28 and 30, and the first connecting portion includes a connecting plate 22. The front plate 26 has a substantially vertical face that is generally rectangular in shape. The vertical face of the front plate 26 is substantially perpendicular to the horizontal face of the connecting plate 22. In exemplary embodiments, the horizontal face of the connecting plate 22 and the vertical face of the front plate 26 connect to form an angle of approximately 90 degrees. In other exemplary embodiments, the front plate 26 has a height of approximately 3.578 inches, and a width of approximately 3.975 inches. However, in other embodiments, the front plate 26 may be non-uniform in width and/or height, and may be of any other height or width suitable for the application.

The side plate 28 is connected to a first side of the front plate 26, and the side plate 30 is connected to a second side of the front plate 26 that is opposite the first side. The side plates 28 and 30 each have a vertical face extending out nearly perpendicularly from the front plate 26. In exemplary embodiments, the side plates 28 and 30 each form an angle of approximately 95 degrees with the front plate 26. The vertical faces of the side plates 28 and 30 are positioned nearly parallel to each other. In the illustrated embodiment of FIG. 2, the side plates 28 and 30 include three sets of slots 32, 34, and 36. Each side plate 28 and 30 includes three matching staggered slots 32, 34, and 36 that form corresponding pairs of slots. The slots 32, 34, and 36 are staggered in height, configured to attach the lockdown bracket 20 to a side wall with a corresponding height, such as side wall 14, on the bottom frame 12 of the refrigerated display case 10. The slots 32, 34, and 36 are formed to fit over the corresponding side wall 14 of the bottom frame 12, thus restricting or eliminating movement of the object in a vertical direction, and in a horizontal direction perpendicular to the frame 12. Each pair of slots 32, 34, or 36 has a depth that corresponds to the dimensions of a side wall and frame on a different type of display case, so that a single bracket 20 may be used on a variety of cases. The lockdown bracket 20 attaches to the side wall 14 of the bottom frame 12, coupling the lockdown device 16 to the refrigerated display case 10.

Figure 3:
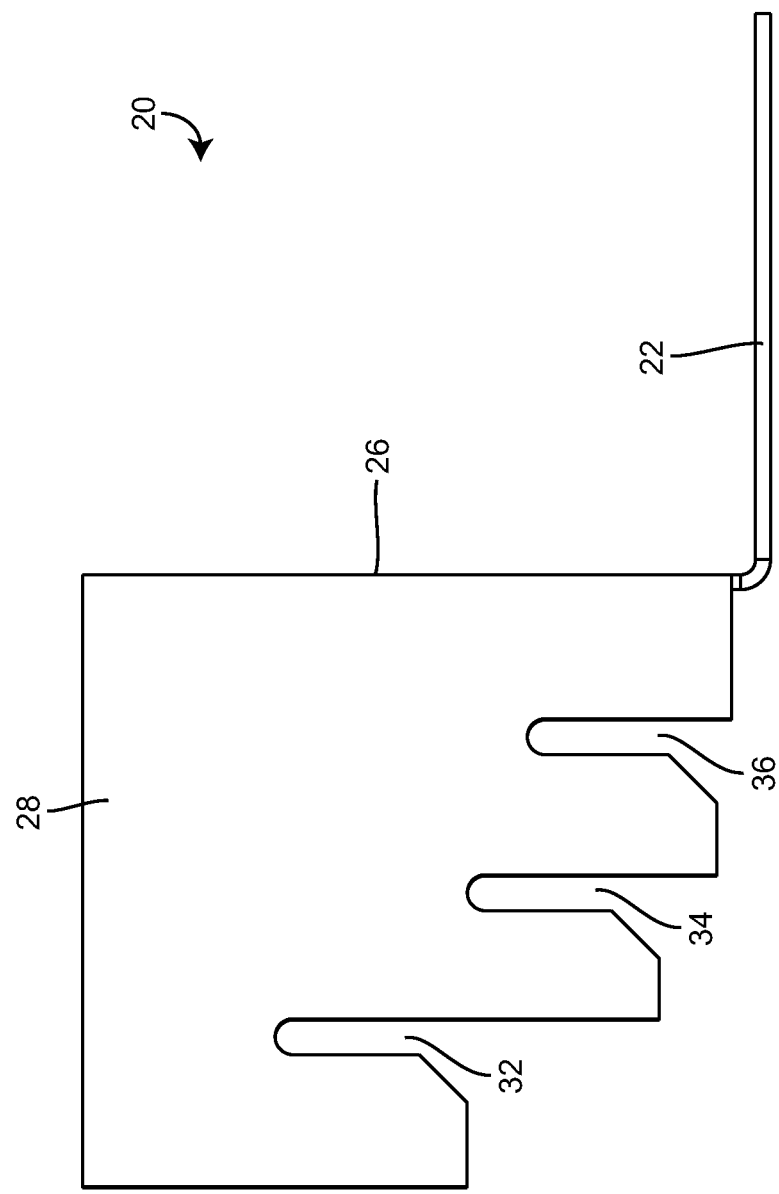
FIG. 3 is a side view of the lockdown bracket of FIG. 2.

Referring now to FIG. 3, a side view of the lockdown bracket 20 is shown, according to an exemplary embodiment. The front plate 26 is shown as substantially perpendicular to the connecting plate 22. In the illustrated embodiment of FIG. 3, each side plate 28 and 30 of the lockdown bracket 20 includes a first slot 32, a second slot 34, and a third slot 36. However, in other embodiments, the lockdown bracket 20 may include more or less slots depending on what is suitable for the particular application. The slots 32, 34, and 36 are sized to fit over a wall such as side wall 14 of the bottom frame 12 of the refrigerated display case 10. The slots 32, 34, and 36 are configured to fit snugly over the side wall 14, coupling the refrigerated display case 10 to the lockdown device 16, thus reducing the movement of the refrigerated display case 10 relative to the lockdown device 16.

The three slots 32, 34, and 36 are staggered in height (i.e. distance from the connecting plate 22 or floor surface) so that the lockdown bracket 20 can be used to secure a variety of refrigerated display cases (i.e. such as case 10) having taller or shorter side walls 14. The height of the side wall 14 determines which slot 32, 34, or 36 is used to secure the refrigerated display case 10, with the first slot 32 formed to fit taller side walls 14 than the second slot 34, and the second slot 34 formed to fit taller side walls 14 than the third slot 36. In exemplary embodiments, the first slot 32 has a depth of 2.578 inches, the second slot 34 has a depth of 1.578 inches, and the third slot 36 has a depth of 1.266 inches (all depths from the bottom of the connecting plate 22). In other embodiments, the slots 32, 34, and 36 may be of any depth suitable for the particular application, and the lockdown bracket 20 may include any number of slots suitable for the particular application. For instance, the lockdown bracket 20 may include more than three slots on each side plate 28 and 30 in order to secure a greater variety of display cases 10.

Figure 4:
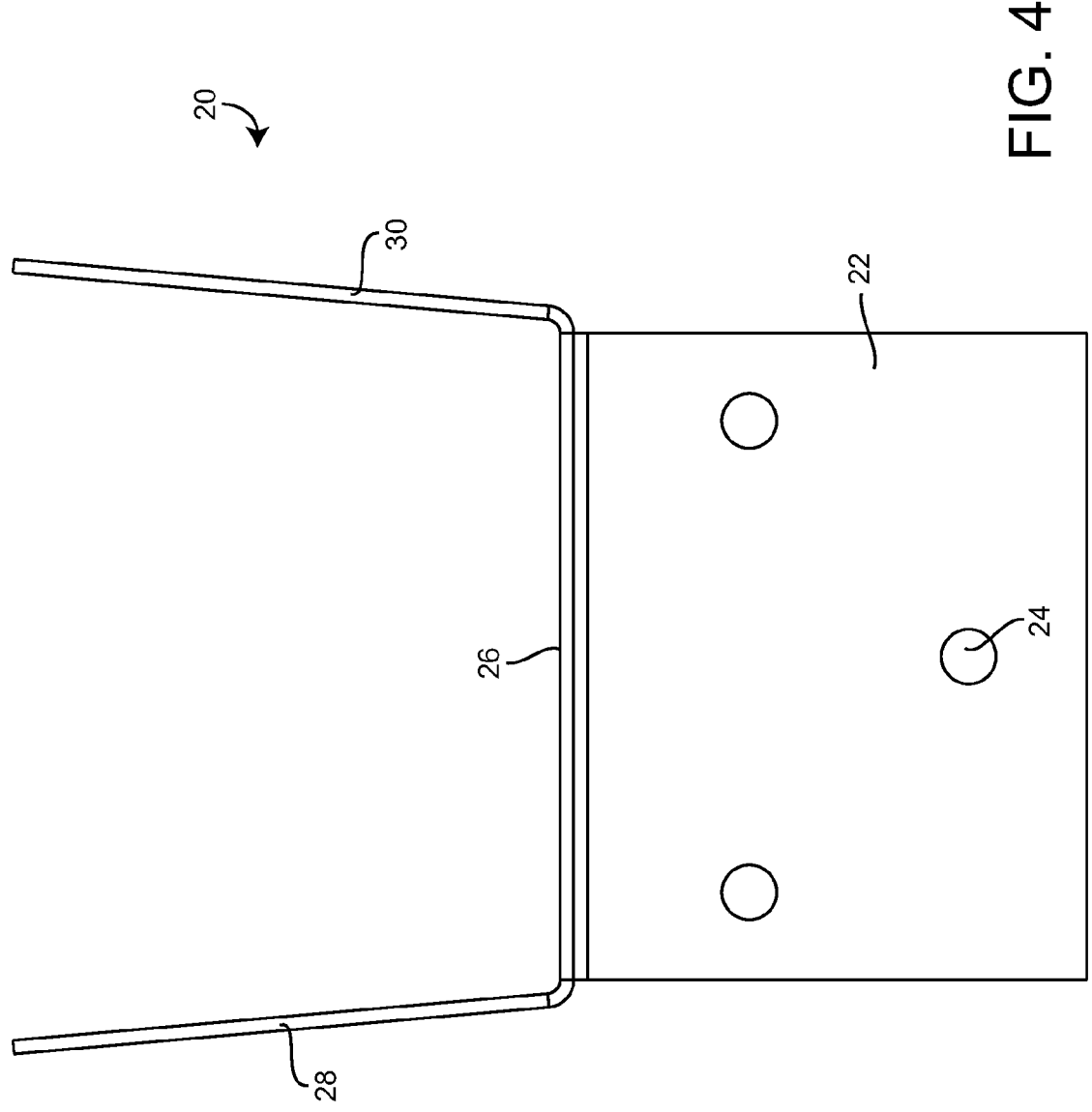
FIG. 4 is a top view of the lockdown bracket of FIG. 2.

Referring now to FIG. 4, a top view of the lockdown bracket 20 is shown, according to an exemplary embodiment. The side plates 28 and 30 of the lockdown bracket 20 are connected to the front plate 26, extending out nearly perpendicularly from the front plate 26. In exemplary embodiments, the side plates 28 and 30 extend out from the front plate 26 at a non-right angle, creating an angle of approximately 95 degrees with the front plate 26. The side plates 28 and 30 are thus biased into a perpendicular position to engage a particular pair of slots 32, 34, or 36 on the side wall 14. The side plates 28 and 30, in this inwardly-biased position, are configured to resiliently flex outward once engaged, binding the edges of slots 32, 34, or 36 against the side wall 14 and reducing or eliminating movement of the lockdown bracket 20 in a horizontal direction along the side wall 14. According to one embodiment, the non-parallel relationship of the side plates 28 and 30 and the edges of the slots 32, 34, or 36 are intended to bind against the side wall 14 to prevent the side wall 14 from slipping or sliding laterally through the slots 32, 34, or 36. For example, when the side plates 28 and 30 are deformed into a parallel relationship so that a pair of slots 32, 34, or 36 may be engaged with the side wall 14, upon releasing the side plates 28 and 30, the side plates 28 and 30 flex into a non-parallel relationship that binds an outer edge of each slot 32, 34, or 36 against an inner surface of the side wall 14 and binds an inner edge of each slot 32, 34, or 36 against an outer surface of the side wall 14. The frictional interaction of these edges and surfaces "locks" the bracket 20 to the side wall 14, until the side plates 28 and 30 are deformed into a parallel relationship to allow the bracket 20 to be removed from the object. As shown in FIG. 1, the angle of the side plates 28 and 30 causes the slots 32, 34, and 36 to contact the side wall 14 at a non-right angle. The angle at which the slot 32, 34, or 36 contacts the side wall 14 is intended to create a friction force between the slot 32, 34, or 36 and the side wall 14, thus "locking" the lockdown bracket 20 to the side wall 14, and thus reducing the movement of the lockdown bracket 20 in relation to the side wall 14.

The connecting plate 22 is rectangular in shape and is connected to the front plate 26. In exemplary embodiments, the distance from the bottom-most edge (according to FIG. 4) of the connecting plate 22 and the connection between the connecting plate 22 and the front plate 26 is approximately 3.000 inches. In these embodiments, the distance from the left edge of the connecting plate 22 to the right edge of the connecting plate 22 (according to FIG. 4) is approximately 3.689 inches. In other embodiments, the connecting plate 22 may be non-rectangular, or may be of any other dimensions suitable for the particular application. The three connecting holes 24 are approximately equal in size and are sized to receive one or more locking assemblies. The locking assemblies are fitted through the connecting plate 22, coupling the connecting plate 22 and the lockdown bracket 20 to the platform 18.

Figure 5:
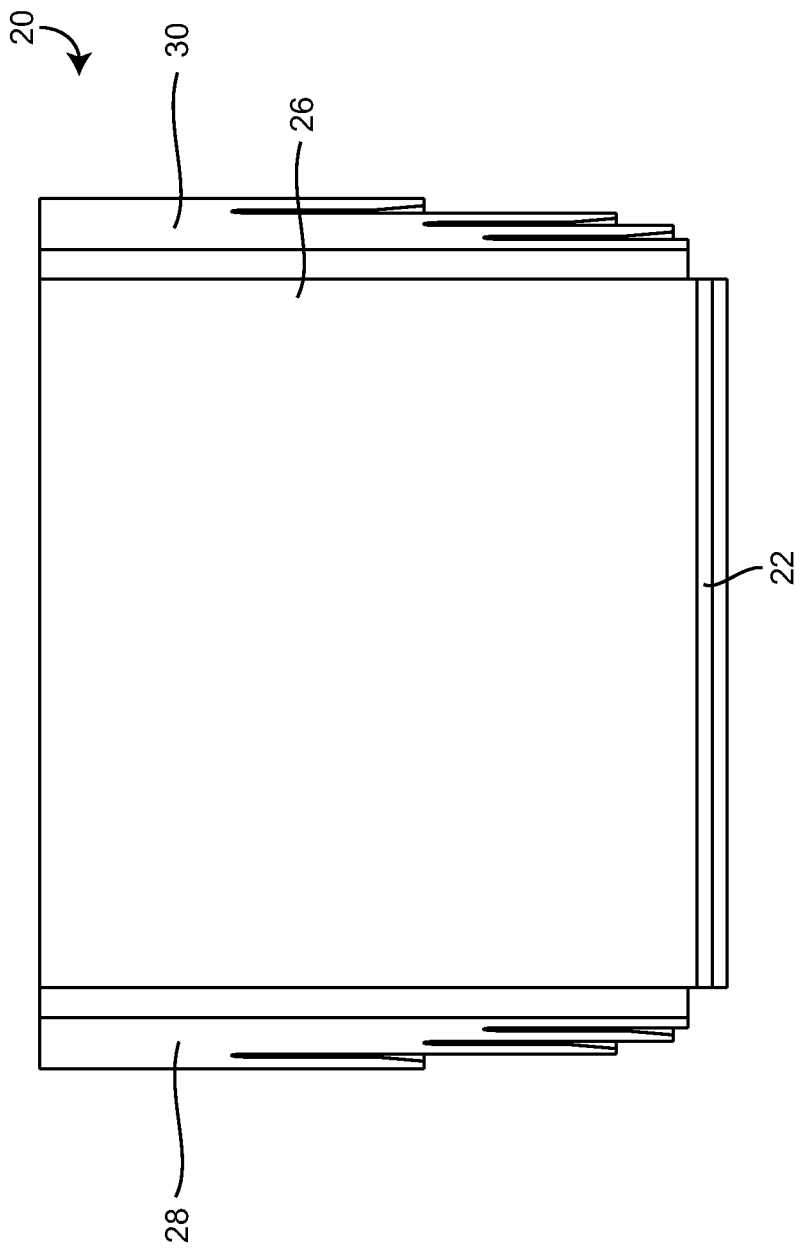
FIG. 5 is a front view of the lockdown bracket of FIG. 2.

Referring now to FIG. 5, a front view of the lockdown bracket 20 is shown, according to an exemplary embodiment. The front plate 26 is shown in FIG. 5 as being rectangular in shape. In exemplary embodiments the height of the front plate 26 is approximately 3.578 inches, and the width of the front plate 26 is approximately 3.856 inches. In other embodiments, the front plate 26 may be non-rectangular, or may be of any other dimensions suitable for the particular application. The front view of FIG. 5 shows the angle at which the side plates 28 and 30 extend out from the front plate 26, contacting the bottom frame 12 of the refrigerated display case 10.

Referring now to FIG. 6, a flat representation of the lockdown bracket 20 is shown, according to an exemplary embodiment. As shown in FIG. 6, the lockdown bracket 20 is approximately symmetrical, having slots 32, 34, and 36 on both side plates 28 and 30. The connecting holes 24 are also symmetrical, having one hole 24 on each side of the connecting plate 22, and one hole 24 in the middle of the connecting plate 22. According to one embodiment, the lockdown bracket 20 may be formed by stamping a flat sheet of material (e.g. galvanized steel, etc.) and then bending the front wall 26 and side walls 28 and 30 to the desired angular positions.

The construction and arrangements of the lockdown device, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A lockdown device for a display case, the lockdown device comprising:
   a platform configured to couple the lockdown device to a surface;
   a lockdown bracket coupled to the platform and configured to attach to the display case, the lockdown bracket comprising:
      a connecting portion having a substantially horizontal plate coupled to the platform;
      a receiving portion comprising:
         a substantially vertical plate with a first side coupled to the horizontal plate and a second side opposite a third side;
         a first side plate comprising a first set of slots, the first side plate coupled to the second side of the vertical plate and forming a non-right angle with the vertical plate;
         a second side plate comprising a second set of slots, the second set of slots corresponding with the first set of slots, the second side plate coupled to the third side of the vertical plate and forming a non-right angle with the vertical plate, the second side plate positioned non-parallel to the first side plate;
      wherein both sets of slots are configured to attach to the display case, and the first and second side plates are configured to reduce the movement of the lockdown bracket relative to the display case.

2. The lockdown device of claim 1, wherein the both set of slots have a depth corresponding to the dimensions of a side wall on the display case.

3. The lockdown device of claim 2, wherein the both sets of slots comprise a first pair of slots having a first predetermined depth, a second pair of slots having a second predetermined depth, and a third pair of slots having a third predetermined depth.

4. The lockdown device of claim 3, wherein the second predetermined depth is greater than the first predetermined depth, and the third predetermined depth is greater than the second predetermined depth.

5. The lockdown device of claim 1, wherein the side plates are configured to bias into a position parallel to each other, aligning one slot of the first set of slots of the first side plate with another slot of the second set of slots of the second side plate to engage the display case.

6. The lockdown device of claim 1, wherein the both set of slots are configured to attach to the display case at a non-right angle, creating a friction force between an edge of the set of slots and the display case.

7. The lockdown device of claim 6, wherein the first side plate forms an angle of approximately 95 degrees with the vertical plate, and the second side plate forms an angle of approximately 95 degrees with the vertical plate.

8. The lockdown device of claim 1, wherein the horizontal plate comprises three connecting holes configured to receive a fastener.

9. The lockdown device of claim 1, wherein the platform is made from a wood material.

10. The lockdown device of claim 1, wherein the lockdown bracket is made from a galvanized steel material.

11. A lockdown bracket for a display case, the bracket comprising:
- a horizontal plate configured to attach to a surface;
- a vertical plate having a first side coupled to the horizontal plate and a second side opposite a third side;
- a first side plate comprising a first set of staggered slots, the first side plate coupled to the second side of the vertical plate and forming a non-right angle with the vertical plate;
- a second side plate comprising a second set of staggered slots corresponding with the first set of staggered slots, the second side plate coupled to the third side of the vertical plate and forming a non-right angle with the vertical plate, and the second side plate positioned non-parallel to the first side plate;
- wherein both sets of slots form a group of staggered pairs of slots, where at least one of the staggered pairs of slots is configured to attach to the display case, and the side plates are configured to resiliently engage edges of one of the staggered pairs of slots against a side wall of the display case to restrict movement of the display case and at least one of the staggered pairs of slots have a depth corresponding to the dimensions of a side wall on one display case, and another of the staggered pairs of slots have a depth corresponding to the dimensions of a side wall on another display case.

12. The lockdown bracket of claim 11, wherein the staggered pairs of slots comprise a first pair of slots having a first predetermined depth, a second pair of slots having a second predetermined depth, and a third pair of slots having a third predetermined depth.

13. The lockdown bracket of claim 12, wherein the second predetermined depth is greater than the first predetermined depth, and the third predetermined depth is greater than the second predetermined depth.

14. The lockdown bracket of claim 11, wherein the side plates are configured to bias into a position parallel to each other, aligning one of the pairs of staggered slots from the first and second side plates to engage a side wall portion of the display case.

15. The lockdown bracket of claim 11, wherein the slots are configured to attach to the display case at a non-right angle, creating a friction force between an edge of the slots and the display case.

16. The lockdown bracket of claim 15, wherein the first side plate forms an angle of approximately 95 degrees with the vertical plate, and the second side plate forms an angle of approximately 95 degrees with the vertical plate.

17. The lockdown bracket of claim 11, wherein the lockdown bracket is made from a galvanized steel material.

* * * * *